United States Patent
Martino et al.

(10) Patent No.: US 6,833,102 B2
(45) Date of Patent: Dec. 21, 2004

(54) LEG MANIFOLD MOUNTING ARRANGEMENT

(75) Inventors: Filippo Martino, Mississauga (CA); Vincent Travaglini, Maple (CA); Gary Fong, Markham (CA); Kyung-Tae Lee, Rexdale (CA)

(73) Assignee: StackTeck Systems LTD, Ontario (CA)

( * ) Notice: Subject to any disclaimer, the term of this patent is extended or adjusted under 35 U.S.C. 154(b) by 212 days.

(21) Appl. No.: 10/315,286

(22) Filed: Dec. 9, 2002

(65) Prior Publication Data

US 2004/0068855 A1 Apr. 15, 2004

(30) Foreign Application Priority Data

Oct. 9, 2002 (CA) .............................................. 2407165

(51) Int. Cl.[7] .............................................. B29C 45/22
(52) U.S. Cl. ..................... 264/328.8; 425/572; 425/588
(58) Field of Search ...................... 29/434, 428, 890.08; 264/328.1, 328.8; 425/542, 572, 588

(56) References Cited

U.S. PATENT DOCUMENTS

| | | | | |
|---|---|---|---|---|
| 3,812,228 A | * | 5/1974 | Skoroszewski | 264/54 |
| 4,586,887 A | * | 5/1986 | Gellert | 425/144 |
| 4,588,367 A | * | 5/1986 | Schad | 425/549 |
| 5,044,927 A | * | 9/1991 | DiSimone et al. | 425/567 |
| 5,220,154 A | * | 6/1993 | Gunther | 425/549 |
| 5,540,580 A | * | 7/1996 | Takada | 425/539 |
| 5,705,202 A | * | 1/1998 | Gellert | 425/549 |
| 5,846,472 A | * | 12/1998 | Rozema et al. | 264/297.2 |
| 6,561,790 B2 | * | 5/2003 | Blais et al. | 425/572 |
| 6,669,462 B1 | * | 12/2003 | Jenko | 425/549 |

* cited by examiner

Primary Examiner—Jill L. Heitbrink
(74) Attorney, Agent, or Firm—J. Herbert O'Toole; Nexsen Pruet, LLC

(57) ABSTRACT

According to the present invention, a manifold mounting arrangement is provided wherein a leg manifold is securely mounted midway along its length rather than at its sprue bushing and whereby thermally induced length changes are accommodated outwardly from its centre. Additionally, a first end of the leg manifold is clampingly secured between a sprue housing and a manifold insulator to avoid movement of the first end toward the sprue upon a sprue break portion of the injection moulding cycle.

9 Claims, 2 Drawing Sheets

LEG MANIFOLD MOUNTING ARRANGEMENT

FIELD OF THE INVENTION

This invention relates generally to moulding apparatus for the injection moulding of plastics. More particularly, this invention relates to the mounting of a "leg manifold" in a multi-level stack moulding arrangement.

BACKGROUND OF THE INVENTION

In designing multi-level, multi-cavity stack moulds, such as 2, 3 or 4 level moulds, consideration must be given to maintaining balanced melt flow. It is often ideal to originate melt flow from a central axis of the mould for each level. This may require a melt flow path which originates at the mould axis, extends radially outwardly through a "leg manifold" to the edge of the mould, crosses a "level" through a crossover nozzle and returns radially inwardly back to the central axis through a further leg manifold displaced longitudinally along the mould axis from the first leg manifold. The number of leg manifolds will depend on the number of mould levels. Typical arrangements where radially inward and outward melt flow paths are present are illustrated in U.S. Pat. No. 5,846,472 (three level) and U.S. Pat. No. 5,458,843 (two and four level).

As injection moulding apparatus are principally made of metal which expands significantly between room temperature and its operating temperature, provision has to be made to accommodate thermal growth/contraction of the leg manifold by amounts on the order of 0.125 inches (approximately 3.3 mm). FIG. 1 schematically illustrates a typical axial cross-section through a "prior art" mounting arrangement. A leg manifold 10 is illustrated as providing a fluid conduit between a sprue bushing 12 located on the central axis 14 of the mould and a crossover nozzle housing 16 disposed generally parallel to but radially outwardly of the central axis 14 of the mould. The leg manifold 10 is located on the central axis 14 by a means such as a first manifold insulator 18 having a first locating spigot 20 which engages a socket 22 in the leg manifold 10 across from the sprue bushing 12.

In theory at least, the leg manifold 10 will expand radially outwardly from the mould axis 14. The end of the leg manifold adjacent the crossover nozzle housing 16 is clamped between the crossover nozzle housing 16 and a second manifold insulator 24. The second manifold insulator 24 has a second locating spigot 26. The second locating spigot 26, is received in a slot 28 in an injection plate 30 against which it presses. While, it is intended that longitudinal movement should be accommodated by movement of the second spigot 26 in the slot 28 and sliding movement between the leg manifold 10 and the crossover nozzle housing 16, often this doesn't occur. Instead the first locating spigot 20 ends up being sheared off in turn pressing the leg manifold 10 toward the sprue bushing 12 and misaligning the sprue bushing 12 in its locator ring 30.

A further disadvantage to the prior art design is that there is no clamping force applied to the sprue bushing end of the leg manifold 10. When "sprue break" occurs in the injection moulding cycle during which the injection machine nozzle is disengaged from the sprue bushing 12. The sprue bushing is slidably received in a locating ring 32 and therefore doesn't "clamp" the leg manifold 10 against the first manifold insulator 18. Repeated engagement and disengagement of the injection machine nozzle and sprue bushing 12 has a "hammering" effect on the leg manifold 10 which eventually causes curvature of the leg manifold away from the sprue bushing.

It is an object of the present invention to provide a mounting arrangement for a leg manifold which better accommodates thermal growth and shrinkage than the above described arrangement.

BRIEF SUMMARY OF THE INVENTION

According to the present invention, a manifold mounting arrangement is provided wherein a leg manifold is fixedly secured at a central location along its length rather than at its sprue bushing and whereby thermally induced length changes are accommodated outwardly from this central location. Additionally, a first end of the leg manifold is clampingly secured between a sprue housing and a manifold insulator to avoid movement of the first end toward the sprue upon a sprue break portion of the injection moulding cycle.

More specifically, a manifold mounting arrangement for a leg manifold of an injection moulding apparatus is provided. The manifold mounting arrangement includes an injection plate, a manifold plate secured to the injection plate and a cavity defined between the manifold plate and the injection plate. The leg manifold, which has first and second opposite ends, is disposed in the cavity. The first end of the leg manifold is located by a first manifold insulator extending between the first end and the manifold plate and by a sprue housing having a flange extending between the leg manifold and the injection plate. The second end of the leg manifold is located by a second manifold insulator extending between the second end and the injection plate and by a crossover nozzle housing having a flange extending between the leg manifold and the manifold plate. The leg manifold has a melt passage extending through it which fluidly communicates at the first end with a sprue passage extending through the sprue housing and at the second end with a crossover nozzle passage extending through the crossover nozzle housing. The leg manifold is further supported along its length between central manifold insulators which extend between the leg manifold and the injection plate and between the leg manifold and the manifold plate. The first and second manifold insulators are positioned to allow longitudinal movement of the first and second ends of the leg manifold relative respectively to the sprue housing and the crossover nozzle housing in response to thermal expansion and contraction of the leg manifold. The central manifold insulators constrain the leg manifold from longitudinal movement to limit such movement to the first and second ends.

The central manifold insulators may be secured by respective securing means extending into the injection and manifold plates and at least some of the central manifold insulators may be provided with projections or recesses which engage corresponding projections or recesses in the like manifold to constrain its longitudinal movement.

The securing means may include a socket extending into the manifold plate and a socket extending into the injection plate for respectively receiving the second and the first manifold insulators.

The securing means may alternatively be threaded fasteners. In a preferred embodiment, the central manifold insulators are disposed about midway along the length of the leg manifold so that normal movement is divided approximately equally between the first and second ends relatively respectively to the sprue housing and the crossover nozzle housing.

BRIEF DESCRIPTION OF THE DRAWINGS

Preferred embodiments of the present invention are described below with reference to the accompanying drawings in which.

DETAILED DESCRIPTION OF THE INVENTION

Figure 2:
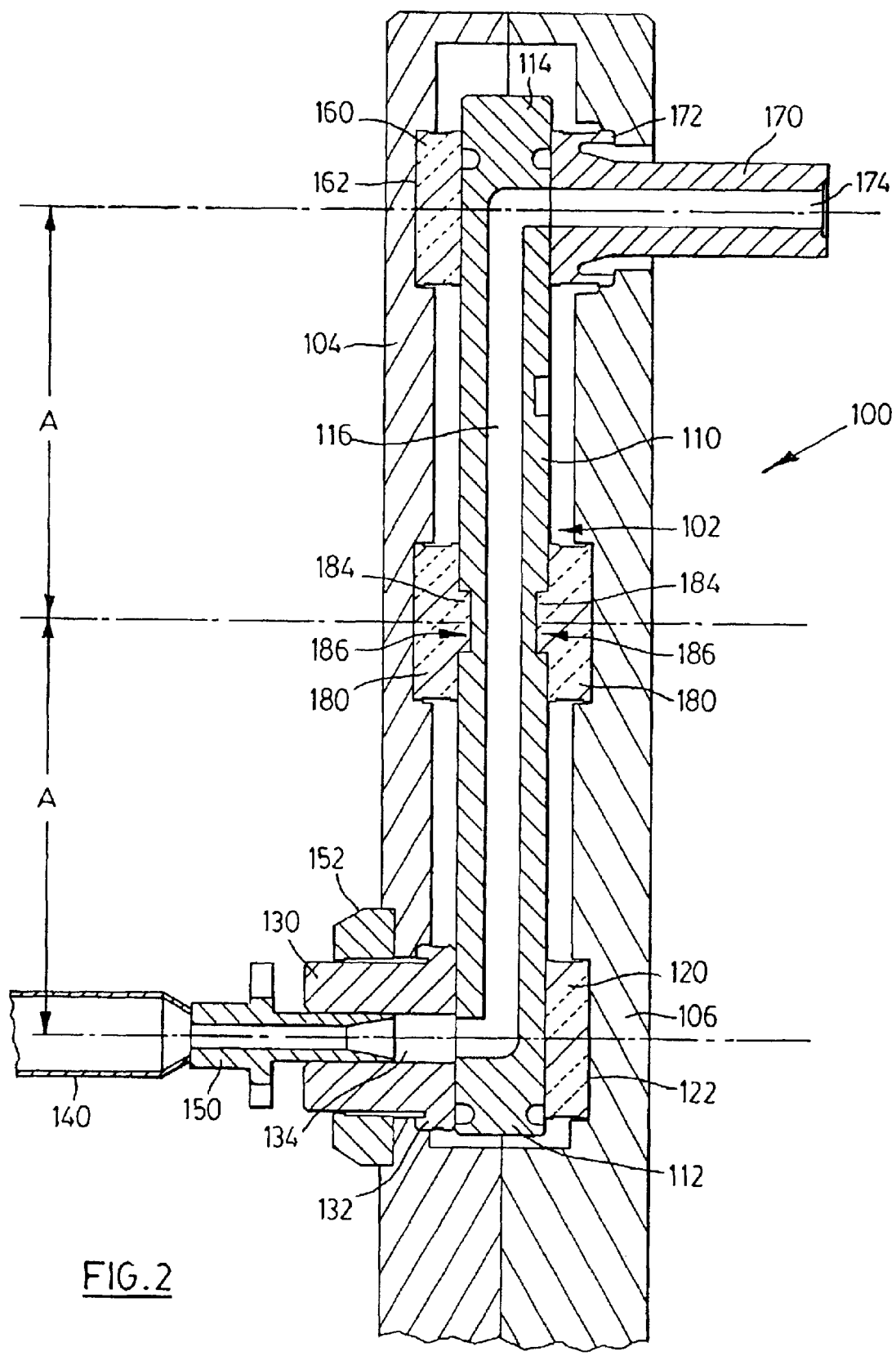
FIG. 2 is a schematic view of an axial cross-section through a manifold mounting arrangement according to the present invention for a leg manifold.

A manifold mounting arrangement according to the present invention is generally indicated by reference 100 in FIG. 2. The arrangement 100 mounts a leg manifold 110 in a cavity 102 defined between mating surfaces of an injection plate 104 and a manifold plate 106.

The leg manifold 110 has a first end 112 and a second end 114 opposite the first end 110. A first manifold insulator 120 is positioned between the first end 112 and the manifold plate 106 to limit movement of the first end 112 toward the manifold plate 106. Unlike the prior art arrangement, the first end 112 is free to slide relative to the first manifold insulator 120. The first manifold insulator 120 may be received in a recess 122 in the manifold plate 106 to secure it to the manifold plate 106. Other securing means, such as threaded fasteners might also be used or it might be formed as part of either the leg manifold 110 or the injection plate 104.

Figure 1:
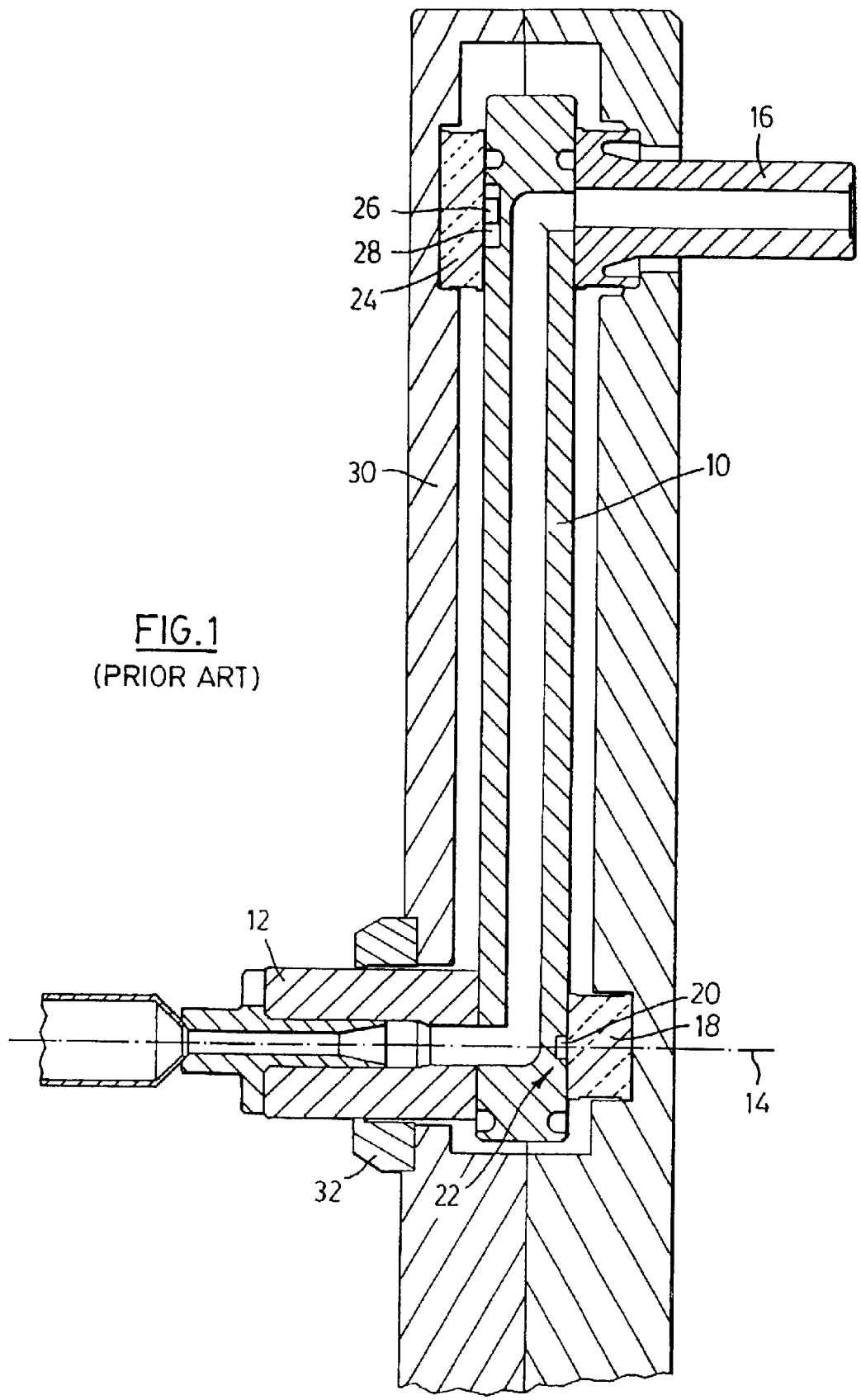
FIG. 1 is a schematic view of an axial cross-section through a prior art manifold arrangement.

Across from the first manifold insulator 122, on the opposite side of the first end 112 of the leg manifold 110 is a sprue housing 130 which extends through the injection plate 104. Unlike the sprue bushing 12 in the FIG. 1 embodiment, the sprue housing 130 includes a flange 132 which engages the injection plate 104 to prevent its withdrawal from the injection plate 104 (to the left as illustrated). In other aspects, the sprue housing 130 is similar to a sprue bushing. It mates with an injection machine nozzle 140 through an anti-drool device 150 and may extend through a locating ring 152.

The first end 112 of the leg manifold 110 is in effect "clamped" between the first manifold insulator 120 and the sprue housing 130. In other words, the first end 112 is pressed up against the sprue housing 130 to sealingly engage the sprue housing. Given enough force to overcome friction between the first end 112 and the first manifold insulator 120 and the sprue housing 130, the first end can slide at least vertically (as illustrated) relative to the first manifold insulator 120 and the sprue housing 130. Furthermore, the first end 112 is prevented by the sprue housing 130 from moving toward the injection machine nozzle 140 (to the left as illustrated) upon "sprue break" (i.e. when the injection machine nozzle 140 separates from the anti-drool device 150).

The second end 114 of the leg manifold 110 is clamped in a manner similar to the first end 112, but between a second manifold insulator 160 and a crossover nozzle housing 170. The second manifold insulator 160 is secured to the injection plate 104 by suitable securing means such as a recess 162 in the injection plate 104, threaded fasteners, welding or may be integrally formed with the injection plate 104 or leg manifold 110 (not shown). The crossover nozzle housing 170 has a flange 172 which engages the manifold plate 106 to limit movement of the nozzle housing 170 away from the injection plate 104 (to the right as illustrated).

As with the first end 112, the second end 114 of the leg manifold presses up against the cross-over nozzle housing to sealingly engage the crossover nozzle housing 170. Given enough force to overcome friction between the second end 114 the second manifold insulator 160 and the crossover nozzle housing 170, the second end 114 can slide vertically (as illustrated) relative to the second manifold insulator 160 and the crossover nozzle housing 170.

The leg manifold 110 has a melt passage 116 extending through it. The melt passage 116 communicates at the first end 112 with a sprue passage 134 extending through the sprue housing 130. The melt passage 116 fluidly communicates at the second end 114 with a crossover nozzle passage 174 extending through the crossover nozzle housing 170.

The leg manifold 110 is further supported along its length between a pair of central manifold insulators 180, one of which extends between the manifold plate 106 and the leg manifold 110 and the other of which extends between the leg manifold 110 and the injection plate 106. The manifold insulators 180 are received in respective recesses 182 and are provided with projections or locating spigots 184 which engage corresponding recesses 186 in the leg manifold 110. Accordingly the central manifold insulators 180 constrain the leg manifold against the longitudinal movement (vertical as illustrated) in the region of the central manifold insulators 110. This has the effect of limiting longitudinal movement of the leg manifold 110 resulting from thermal expansion or contraction to the first and second ends, 112 and 114 respectively.

In a preferred embodiment, the central manifold insulators 180 may be located about midway along the leg manifold 110 as suggested by dimensions A,A in FIG. 2. This has the beneficial result of dividing thermal expansion and contraction approximately equally between the juncture of the leg manifold 110 and the sprue housing 130 and between the juncture of the leg manifold 110 and the crossover nozzle housing 170. This in turn minimizes the overall restriction to melt flow imposed by misalignment between the melt passage 116, the sprue passage 134 and the crossover nozzle passage 174.

Some benefit would be realized from the arrangement 100 even if the central manifold insulators 110 were disposed closer to either the first end 112 or the second end 114 of the leg manifold 110 in view of the slidability between the first end 112 and the sprue housing 130. Also, a benefit would be realized by virtue of the locating effect of the sprue housing 130 on the first end 112, which is discussed above.

Although a spigot and recess arrangement is illustrated to secure the leg manifold 110 to the central manifold insulators 180, other arrangements may be utilized. For example: the spigot and recess may be reversed as between the central manifold insulators 180 and the leg manifold 110; each of the leg manifolds 110 and the central manifold insulators 180 may have both spigots and recesses; only one of the central manifold insulators 180 need engage the leg manifold 110; other securing means such as welding, threaded fasteners or forming the central manifold insulator as part of the leg manifold 110 or as parts of the manifold plate 106 and the manifold plate 104 may be utilized.

If a sprue bushing is to be utilized in lieu of the sprue housing, another manifold insulator may be mounted adjacent the sprue bushing to limit movement of the first end 112 toward the injection machine nozzle 140 on sprue break.

Although four manifold insulators are illustrated, more may be used to provide further support along the leg manifold 110.

Although single branch manifolds have been described, the above arrangement may be adaptable to multi-branch manifolds such as used in 3-level stack moulds.

The above description is intended in an illustrative rather than a restrictive sense. Variations to the specific structure described may be apparent to persons skilled in the art without departing from the spirit and scope of the present invention which is defined by the claims set out below.

We claim:

1. A manifold mounting arrangement for a leg manifold for an injection moulding apparatus, said mounting arrangement comprising:

an injection plate;

a manifold plate secured to said injection plate;

a cavity defined between said manifold plate and said injection plate;

said leg manifold having first and second opposite ends and being disposed in said cavity;

said first end of said leg manifold being located by a first manifold insulator extending between said first end and said manifold plate and by one of a sprue housing having a flange extending between said leg manifold and said injection plate and a further manifold insulator located adjacent a sprue bushing and extending between said manifold and said injection plate;

said second end of said leg manifold being located by a second manifold insulator extending between said second end and said injection plate and by a crossover nozzle housing having a flange extending between said leg manifold and said manifold plate;

said leg manifold having a melt passage extending therethrough fluidly communicating at said first end with a sprue passage extending through a respective of said sprue housing and said sprue bushing and fluidly communicating at said second end with a crossover nozzle passage extending through said crossover nozzle housing;

said leg manifold being further supported along a length thereof between central manifold insulators extending between said leg manifold and said injection plate and between said leg manifold and said manifold plate;

said first and second manifold insulators are positioned to allow longitudinal movement of said first and said second ends of said leg manifold relatively respectively to said sprue housing, said sprue bushing and said crossover nozzle housing in response to thermal expansion and contraction of said leg manifold;

said central manifold insulators constraining said leg manifold from longitudinal movement to limit such movement to said first and second ends.

2. The manifold mounting arrangement as claimed in claim 1 wherein:

said first, second and central manifold insulators are secured by respective securing means extending into said injection and said manifold plates; and, at least some of said central manifold insulators are provided with at least one of projections and recesses which engage corresponding projections and recesses in said leg manifold to constrain said longitudinal movement.

3. The manifold mounting arrangement of claim 2 wherein:

said securing means includes a recess extending into said manifold plate, and a recess extending into said injection plate for respectively receiving said second and said first manifold insulators.

4. The manifold mounting arrangement of claim 2 wherein:

said securing means are threaded fasteners.

5. The manifold mounting arrangement of claim 1 wherein:

said central manifold insulators are disposed about midway along the length of the leg manifold.

6. The manifold mounting arrangement of claim 2 wherein:

said central manifold insulators are disposed about midway along the length of said leg manifold.

7. The manifold mounting arrangement of claim 3 wherein:

said central manifold insulators are disposed about midway along the length of said leg manifold.

8. The manifold mounting arrangement of claim 4 wherein:

said central manifold insulators are disposed about midway along the length of said leg manifold.

9. A method for mounting a leg manifold of a multi-level stack mould assembly to provide fluid communication between a central manifold and a crossover nozzle housing located radially outwardly of said central manifold, said leg manifold having a first end opposite a second end, a first port at said first end, a second port at said second end and a passage extending and providing fluid communication between said first and said second ports, said method comprising the steps of:

(i) providing said central manifold with a sprue housing having a first melt passage extending therethrough;

(ii) clamping said first end of said leg manifold between a first manifold insulator and said sprue housing with said first port registering with said first melt passage so as to allow transverse sliding movement between said first end and said sprue housing upon exceeding a first force;

(iii) clamping said second end of said leg manifold between a second manifold insulator and said crossover nozzle housing with said second port registering with a second melt passage extending through said crossover nozzle housing so as to allow transverse sliding movement between said second end and said crossover nozzle housing upon exceeding a second force; and, (iv) securing said leg manifold midway along a length thereof between a pair of central manifold insulators against transverse sliding movement;

wherein said first and second forces are selected to cause simultaneous relative transverse sliding movement between said sprue end and said first housing and said second end and said crossover nozzle housing away from said central manifold insulators without imparting significant shearing forces between said central manifold insulators and said leg manifold.

* * * * *